US005691757A

United States Patent [19]

Hayashihara et al.

[11] Patent Number: 5,691,757

[45] Date of Patent: Nov. 25, 1997

[54] LASER MARKING METHOD AND AQUEOUS LASER MARKING COMPOSITION

[75] Inventors: Shoiti Hayashihara; Masaki Shinmoto, both of Yono, Japan

[73] Assignees: Nippon Kayaku Kabushiki Kaisha, Tokyo; Kansai Paint Kabushiki Kaisha, Amagasaki, both of Japan

[21] Appl. No.: 355,084

[22] Filed: Dec. 12, 1994

[30] Foreign Application Priority Data

Dec. 22, 1993 [JP] Japan .................................... 5-345468

[51] Int. Cl.[6] ............................ B41J 2/385; B41J 2/355; G03G 9/08; G01D 15/10

[52] U.S. Cl. .......................... 347/155; 347/185; 347/232; 347/240; 347/251

[58] Field of Search .................................... 347/185, 232, 347/240, 251, 155

[56] References Cited

U.S. PATENT DOCUMENTS

| | | | |
|---|---|---|---|
| 4,506,278 | 3/1985 | Sakamoto et al. | 503/217 |
| 4,510,512 | 4/1985 | Okamoto et al. | 503/208 |

FOREIGN PATENT DOCUMENTS

| | | |
|---|---|---|
| 0381492 | 8/1990 | European Pat. Off. . |
| 0558078 | 1/1993 | European Pat. Off. . |
| 0 600 441 | 6/1994 | European Pat. Off. . |
| 0 637 514 | 2/1995 | European Pat. Off. . |
| 64-18685 | 7/1989 | Japan . |
| 2235060 | 2/1991 | United Kingdom . |

OTHER PUBLICATIONS

Copy of a Communication for the European Patent Office dated Oct. 25, 1996.

*Primary Examiner*—Benjamin R. Fuller
*Assistant Examiner*—Raquel Yvette Gordon
*Attorney, Agent, or Firm*—Nields, Lemack & Dingman

[57] ABSTRACT

This invention relates to a laser marking method which comprises heating a base article having on its surface a thin film of a laser marking composition containing a color former and a color developer having a melting point of 200° C. or above, and then applying laser light to the thin film. The method of this invention is capable of no-break marking with vivid color development by application of laser light, without causing discoloration of the ground even under a condition of 120° C. or above.

20 Claims, No Drawings

LASER MARKING METHOD AND AQUEOUS LASER MARKING COMPOSITION

FIELD OF THE INVENTION

The present invention relates to a laser marking method and a heat-resistant aqueous composition for laser marking which develops color on irradiation with laser light and causes no discoloration of the ground even under the conditions of 120° C. or above.

BACKGROUND OF THE INVENTION

A thermosensitive recording medium designed to form a color image by melting and contacting a color former with a developer and making use of a color reaction by the two substances is known. For carrying out recording with such a thermosensitive recording medium, a recording system is generally employed in which the recording medium is run with its color developing layer in close attachment with a recording head (thermal head) having a heat generating element. In operation of such recording system, however, there are involved various problems such as wear of the head, adhesion of tailings to the head surface and sticking of the head with the color developing layer of the recording medium. Further, since the recording speed depends on the heat dissipation time of the thermal head, it is hardly possible to carry out high-speed printing and also there is the problem of blurring of the color image due to heat diffusion.

Recently, for real-time marking of letters and signs such as maker's name, product name, date of production, lot number, etc., on the surfaces of various commercial articles, for example, electronic parts such as IC's, resistors, condensers, inductors, etc., electrical parts such as relays, switches, connectors, printed circuit boards, etc., housings of electrical devices, automobile parts, machine parts, cables, sheets, packaging sheets, cards, various containers of foods and medicines, caps of containers, etc., the laser marking system is popularly employed for its various advantages such as high speed printing and capability of fine marking. Such laser marking system is essentially based on the principle that marking is made by breaking, that is, laser light is applied to the necessary part alone of the substrate surface to cause denaturing or removal of said part of the substrate, or laser light is applied to the coating film formed on the substrate surface to remove the coating film alone, so as to produce a contrast between the laser irradiated portion and the non-irradiated portion of the substrate.

Studies are being made for applying such laser marking technique to said recording system using a color former and a developer so as to perform marking not by resorting to breaking but by making use of color formation by a chemical change. This new idea of marking can be applied to a wide variety of commercial articles. For example, lavels on the drink bottles, cans, milk packs, injection vial caps and such can be mentioned as typical examples of the articles for which high productivity of marking is required because of massive production and marking is held in great account for maintaining the commercial value. However, various problems are encountered in practical application of this marking system. For example, in the case of cans of drinks, since baking at 180° C. or above is conducted after coating the inner surface of the can for protection thereof, the laser marking composition containing a color former and a developer is exposed to a high temperature of around 180° C. or above when the composition is applied for in-line coating. Also, in the case of milk pack, as it comprises a laminate of polyethylene and base paper and a color forming layer composed of a color former and a developer is sandwiched therebetween, said layer is exposed to heat of around 180° C. or above during lamination. Further, in the case of injection vial cap, where the aluminum cap is coated with a color forming layer composed of a color former and a developer, since the vial needs to be passed through a sterilization step at 120° C. or above before it is filled with an injection, the color forming layer is also placed under the same condition. When the color forming layer basically composed of a color former and a developer is placed under a high-temperature condition in a heat treatment such as mentioned above, color may be formed before said layer is subjected to marking operation or after marking has been performed (this phenomenon is hereinafter called "discoloration of the ground"). This will make unclear distinction between the mark and its surrounding to lessen vividness of the mark, resulting in arising of a claim on product quality or impairment of commercial value of the article. It has therefore been considered improper to apply a heat treatment on the article coated with a color forming layer composed of a color former and a developer.

The present invention is aimed at offering a laser marking method which makes it possible to conduct a heat treatment even when a system comprising a color former and a developer is used for marking composition.

SUMMARY OF THE INVENTION

According to the present invention, there are provided as its embodiments:

(1) A laser marking method which comprises applying laser light to a thin film of a laser marking composition containing a color former and a developer having a melting point of 200° or above, said thin film being present on the surface of a base article to be marked and having been subjected to a heat treatment.

(2) A laser marking method as set forth in (1) above, wherein the melting point of the color former is 150° C. or above, the melting point of the developer is 230° C. or above, and the heat treatment temperature is 100°–250° C.

(3) A laser marking method as set forth in (1) above, wherein the heat treatment temperature is 150°–250° C.

(4) A laser marking method as set forth in (1) above, wherein the melting point of the color former is 200° C. or above, the melting point of the developer is 260° C. or above, and the heat treatment temperature is 150°–250° C.

(5) A laser marking method as set forth in (4) above, wherein the heat treatment temperature is 180°–230° C.

(6) A laser marking method as set forth in (1) above, wherein the developer is 2,2',6,6'-tetramethyl-4,4'-sulfonyldiphenol, 2,2',6,6'-tetrabromo-4,4'-sulfonyldiphenol or 4-hydroxyisophthalic acid.

(7) A laser marking method as set forth in (1) above, wherein the base article is made of a metal, a synthetic resin or paper.

(8) A laser marking method as set forth in (1) above, wherein the laser light is infrared laser light.

(9) A laser marking method which comprises applying laser light to a thin film on the surface of a base article, said thin film being made of an aqueous laser marking composition containing a color former having a melting point of 200° C. or above, a developer having a melting point of 260° C. or above and water and having been subjected to a heat treatment at 150°–250° C.

(10) A laser marking method as set forth in (9) above, wherein the developer is 2,2',6,6'-tetramethyl-4,4'-sulfonyldiphenol, 2,2',6,6'-tetrabromo-4,4'-sulfonyldiphenol or 4-hydroxyiosphthalic acid.

(11) A laser marking method as set forth in (9) above, wherein the base article is a metallic can.

(12) A laser marking method as set forth in (9) above, wherein the laser light is infrared laser light.

(13) An aqueous laser marking composition containing a color former having a melting point of 200° C. or above, a developer having a melting point of 260° C. or above and water.

(14) An article having on its surface a thin film of a composition containing a color former and a developer having a melting point of 200° C. or above, said thin film having been subjected to a heat treatment.

(15) An article as set forth in (14) above, characterized in that the heat treatment temperature is 150°–250° C.

(16) A laser marking method which comprises applying laser light to a thin film of a laser marking composition containing a color former and a developer having a melting point of 200° C. or above, said thin film being present on a base article, and then subjecting said thin film to a heat treatment.

(17) A laser marking method as set forth in (16) above, wherein the heat treatment temperature is 60°–140° C.

The laser marking composition used in the present invention contains as its essential components a color former and a developer having a melting point of 200° C. or above.

Examples of the color developers having a melting point of 200° C. or above (electron acceptive substances) usable in the present invention include bisphenol S (4,4'-sulfonyldiphenol;melting point: 248°–250° C.), 2,2',6,6'-tetramethyl-4,4'-sulfonyldiphenol (melting point: 298°–300° C.), 2,2',6,6'-tetrabromo-4,4'-sulfonyldiphenol (melting point: 278°–280° C.), p-hydroxy-benzoic acid (melting point: 213°–214° C.), 4-hydroxyiso-phthalic acid (decomposition temperature: 314°–315° C.), 3-hydroxy-2-naphthalenecarboxylic acid (melting point: 222°–223° C.), 4,4'-butylidene-bis-(3-methyl-6-t-butyl-phenol) (melting point: 205° C.), 1,3,5-trimethyl-2,4,6-tris(3,5-di-t-butyl-4-hydroxybenzyl) benzene (melting point: 244° C.), 10-(3,5-di-t-butyl-4-hydroxybenzyl)-9,10-dihydro-9-oxa-10-phosphaphenanthren-10-oxide (melting point: 203° C.), and inorganic acidic materials such as activated clay, acidic clay, attapulgite and aluminum silicate. Of these color developers, phenolic compounds having a melting point of 230° C. or above, such as 2,2',6,6'-tetramethyl-4,4'-sulfonyldiphenol (melting point: 298°–300° C.), 2,2',6,6'-tetrabromo-4,4'-sulfonyl-diphenol (melting point: 278°–280° C.),bisphenol S (melting point: 248°–250° C.) are preferred, and those having a melting point of 260° C. or above, such as 2,2',6,6'-tetramethyl-4,4'-sulfonyldiphenol (melting point: 298°–300° C.) and 2,2',6,6'-tetrabromo-4,4'-sulfonyl-diphenol (melting point: 278°–280° C.) are more preferred.

The color former used in the present invention is not specified and any of those usually employed for thermosensitive recording media, specifically leuco dyes (electron donative color-forming compounds) can be used. Examples of such color formers include triallylmethane phthalide type dyes such as 3,3'-bis(p-dimethylamino-phenyl)-6-dimethyl aminophthalide, 3-(p-dimethylamino-phenyl)-3-(1,2-dimethylindole-3-yl) phthalide, 3,3'-bis(1,2-dimethylindole-3-yl)-5-dimethyl aminophthalide and 3-p-dimethylaminophenyl-3-(1-methylpyrrole-3-yl)-6-diethyl aminophthalide; diphenylmethane type dyes such as 4,4'-bis-dimethylaminobenzohydrylbenzyl ether and N-halophenylleucoauramine; thiazine type dyes such as benzoylleucomethylene blue; spiro type dyes such as 3-methyl-naphtho(6'-methoxybenzo)spiropyran and 3-benzyl-spiro-dinaphthopyran; lactam type dyes such as rhodamine B anilinolactam and rhodamine B (o-chloro-anilino) lactam; fluoran type dyes such as 3-diethyl-amino-7-o-fluoroanilinofluoran, 3-dimethylamino-7-o-fluoroanilinofluoran, 3-diethylamino-7-o-chloro-anilinofluoran, 3-dimethylamino-7-o-chloroanilino-fluoran, 3-diethylamino-7-p-chloroanilinofluoran, 3-diethylamino-7-dibenzylaminofluoran, 3-(N-cyclohexyl-N-methylamino)-6-methyl-7-phenylaminofluoran, 3-(N-tolyl-N-ethylamino)-6-methyl-7-phenylaminofluoran, 3-diethylamino-6-methyl-7-phenylaminofluoran and 3-dibutylamino-6-methyl-7-phenylaminofluoran; and fluorene type dyes such as 3,6,6'-tris(dimethylamino)-spiro(fluorene-9,3') phthalide, 3,6-bis (dimethylamino)-fluorenespiro(9,3')-6'-dimethyl aminophthalide, 3,6-bis (dimethylamino)fluorenespiro (9,3') -6'-pyrrolidino phthalide and 3-dimethylamino-6-diethylaminofluorene-spiro (9,3')-6'-pyrrolidino phthalide. Of these color formers, those having a melting point of 150° or above, such as 3-dibutylamino-6-methyl-7-phenylfluoran, are preferred.

Of the above color formers, those having a melting point of 200° C. or above are more preferred for use in this invention. Examples of such color formers include 3-(4-diethylamino-2-ethoxyphenyl)-3-(1,2-dimethylindole-3-yl) phthalide (melting point: 215°–216° C.), 3,3'-bis(1-ethyl-2-methylindole-3-yl) phthalide (melting point: 225°–227° C.), rhodamine B anilinolactam (melting point: 215° C.), rhodamine B (o-chloroanilino)-lactam (melting point: 205°–207° C.), 3-diethylamino-7-o-fluoroanilinofluoran (melting point: 216° C.), 3-dimethylamino-7-o-fluoroanilinofluoran (melting point: 218° C.), 3-diethylamino-7-o-chloroanilinofluoran (melting point; 220°–221° C.), 3-dimethylamino-7-o-chloroanilino-fluoran (melting point: 222°–225° C.), 3-(N-cyclohexyl-N-methylamino)-6-methyl-7-phenylaminofluoran (melting point: 202°–205° C.), 3-diethylamino-6-methyl-7-phenyl-aminofluoran (melting point: 200°–202° C.), 3-diethylamino-6-methyl-7-chlorofluoran (melting point: 235° C.), 3-diethylamino-7,8-benzofluoran (melting point: 219°–220° C.), 2,2-bis(4-(6'-(N-cyclohexyl-N-methylamino)-3'-methylspiro(phthalido-3,9'-xanthene)-2'-ylamino)-phenyl)propane (melting point: 230°–238° C.), 3,6,6'-tris (dimethylamino)spiro(fluorene-9,3,) phthalide (melting point: 244°–246° C.), the bislactone type compounds represented by the following formula (1) (melting point: 355°–357° C.) and the chromenopyrazole type compounds represented by the following formula (2) (melting point: 260°–261° C.). Preferred of the above color formers are, for example, 3-diethylamino-7-o-fluoroanilinofluoran (melting point: 216° C.), 3-diethylamino-7-o-chloroanilinofluoran (melting point: 220°–221° C.) and 2,2-bis(4-(6'-(N-cyclohexyl-N-methylamino)-3,-methyl-spiro (phthalido-3,9'-xanthene)-2,-ylamino)phenyl)propane (melting point: 230°–238° C.).

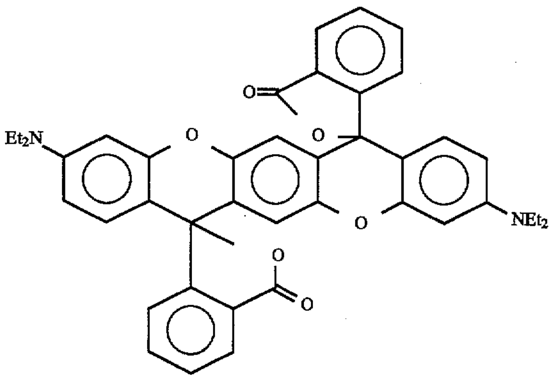

(1)

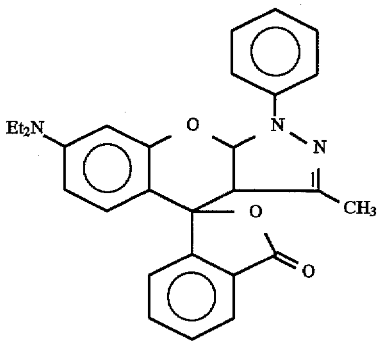

(2)

The ratios of the color format and the developer in the composition of the present invention are not specified but can be properly selected according to the type of the color former and the developer used. Usually, however, the color developer is used in a ratio of preferably 1–50 parts by weight, more preferably 1.5–10 parts by weight, to one part by weight of the color former. As for the proportions of said components in the whole solid matter in the composition of the present invention, the color former is preferably 5–30% by weight, more preferably 10–25% by weight, and the color developer is preferably 10–60% by weight, more preferably 20–50% by weight.

In the laser marking composition used in the present invention, an inorganic compound capable of absorbing laser light may be added for elevating sensitivity to laser light. Examples of such inorganic compounds include aluminum oxide, mica, wolllastonite, bentonite, hydrous silica, calcium silicate, talc, kaolin and clay. Aluminum hydroxide and mica are especially preferred. The amount of the inorganic compound used in the composition is 1–50 parts by weight, preferably 1.5–10 parts by weight, to one part by weight of the color former. The ratio of the inorganic compound in the solid matter in the composition is 5–40% by weight, preferably 10–30% by weight. These inorganic compounds may be used as a mixture of two or more of them.

In the composition of the present invention, there may further be added a binder and various kinds of auxiliaries for facilitating coating of the composition on the base article. Examples of the binders usable in this invention include starches, hydroxyethyl cellulose, methyl cellulose, carboxymethyl cellulose, gelatin, casein, gum arabic, polyvinyl alcohol, styrene-maleic anhydride copolymer salts, styrene-acrylic acid co-polymer salts, styrene-butadiene copolymer emulsion and the like. The binder is added in an amount of about 2 to 40% by weight, preferably about 5 to 35% by weight, based on the overall amount of the solid matter in the composition.

The auxiliaries usable in the composition of this invention include dispersants such as sodium dioctylsulfosuccinate, sodium dodecylbenzenesulfonate, sodium salts of lauryl alcohol sulfurates and fatty acid metal salts; ultraviolet ray absorbers such as benzo-phenone type and triazole type; defoaming agents, fluorescent dyes, and colorants. Further, in the composition of the present invention, higher fatty acid amides such as stearic acid amides, waxes such as beeswax, shellac wax, carnauba wax, montan wax, paraffin wax, petroleum wax, higher fatty acid esters, chlorinated paraffin and synthetic paraffin, acetoacetic anilides, diphenylamines, carbazoles, fatty acid-anilides, carboxylic acid esters such as dimethyl terephthalate and diphenyl phthalate, sulfonic acid amides such as benzenesulfonic acid anilide, sulfonic acid esters such as p-toluene sulfonic acid phenoxy ethyl ester and benzenesulfonic acid phenyl ester, diphenylsulfones such as bis-(4-allyloxyphenyl)sulfone and bis-(4-pentylphenyl)sulfone, naphthol derivatives such as 1-benzyloxynaphthalene and 2-benzoyloxy-naphthalene, urea derivatives such as N-stearylurea, diketone compounds such as 4-acetylacetophenone and octadecane-2,17-dione, ethers such as 1,2-m-cresyloxy-ethane and others can be properly used as sensitizer. When a sensitizer such as mentioned above is used, its amount should be in the range where no discoloration of the ground won't be caused at 120° C. or above (for example, in the range of preferably 0.1–3 parts by weight, more preferably 0.2–2 parts by weight, to one part by weight of the color former). These additives are used in a dispersed form like the color former and the developer. The average particle size of the additives is usually less than 2 μm, preferably less than 1 μm, as in the case of the color former and the developer.

The base article used in the present invention is not specified. For example, plates, caps and containers, such as bottles, and cans made of various types of metal such as iron or aluminum or various types of synthetic resin such as polyethylene, polypropylene, nylon, ABS resin, styrene, etc., coated version thereof, film, paper, synthetic paper, metallized paper, metallized film and the like can be used as base article.

Of these articles, those which are heat treated after coated with the composition of this invention are preferred. Typical examples of such articles are cans of drinks such as cans of beer and cans of juice, cans of foods, metallic food containers, caps thereof, bottles, plastic food containers, caps thereof, plastic food packaging materials such as plastic film for retorted food, paper food containers such as paper pack, and medical articles such as vials and caps thereof.

The laser marking composition of the present invention can be obtained by mixing a color former, a color developer and, if necessary, a laser light absorptive inorganic compound, a binder and various kinds of auxiliaries such as mentioned above. For facilitating mixing, a dispersion medium such as water may be used. The composition prepared by using water as dispersion medium is called aqueous laser marking composition. As for the proportions of the respective components in the aqueous composition, the color former is 3–20%, preferably 5–10%, the color developer is 5–30%, preferably 10–20%, the inorganic compound is 5–30%, preferably 6–15%, the binder is 5–30%, preferably 7–15%, the auxiliaries are 0.3–50%, preferably 1–20%, and water is 35–75%, preferably 40–60%.

The heat treatment in the present invention means a "substantial" heat treatment such as sterilization, and it does not comprehend a treatment by which the temperature of the part of the article other than its surface is scarcely raised, such as drying effected by applying hot air of 40°–50° C. for a short period of time. The temperature of this heat treatment is 60°–250° C. This heat treatment may be conducted either before the laser marking operation is started or after it has been completed. The heat treatment prior to laser marking is performed principally for affording a new function to the substrate such as interior anti-corrosive coating of a drink can, laminated paper or laminated film, or for sterilization of specific articles such as vial caps. The temperature of this heat treatment is 100°–250° C., more effectively 150°–250° C., even more effectively 180°–230° C. In case of the former purpose, the temperature is around 150°–250° C., preferably around 150°–220° C., more preferably around 180°–230° C. In case of the latter purpose, the temperature is around 100°–150° C. The heat treatment after laser marking is performed principally for sterilization of foods, and its temperature is around 60°–140° C.

As for the period of the heat treatment, in consideration of discoloration of the ground and other matters, it is desirable to make the period shorter proportionally to the temperature used for the treatment. For example, said period may be about 0.5 to 2.5 hours at 60°–140° C., but it is preferably about 1 to 40 minutes at 180° C. and about 1 to 8 minutes at 210° C.

The present invention is carried out, for example, in the following way. First, the components of the composition used in this invention are dispersed in water, with the binder dissolved, to prepare a coating solution of the composition used in this invention, and this coating solution is applied to the surface of a base article and dried to form a color forming layer. Then laser light is applied to said color forming layer, followed by a heat treatment. Alternatively, said coating solution is applied to the surface of a base article, then a heat treatment is carried out after drying as desired, and laser light is applied to the coated article surface.

In preparation of the coating solution, a color former and a developer are dispersed together or separately by a dispersing device such as ball mill, attritor, sand grinder or the like, usually using water as dispersing medium. An inorganic compound capable of absorbing laser light and various kinds of auxiliaries may be dispersed along with the color former and the developer, or they may be separately added to the coating solution of the color former and the developer after dispersion by said dispersing device. The average particle size of the dispersed color former and the developer is usually less than 2 μm, preferably less than 1 μm. The additives are also similarly dispersed. The average particle size of the additives is usually less than 2 μm, preferably less than 1 μm, as in the case of the color former and the developer.

The way of application of the coating solution on the base article is not defined but various known techniques can be employed for such coating operation. For example, the coating solution may be applied on a support by using an appropriate coating apparatus such as air spray, airless spray, curtain flow coater, electrostatic spray, roller coater, air knife coater, blade coater, gravure coater, etc. Spray coating is preferably employed in case the composition of this invention is applied to a drink can, and gravure coating is preferred when the composition is used for marking on a milk pack. The thickness of the thin film (color forming layer) formed after coating and drying is also not defined, but preferably it is in the range of 1 to 20 μm, more preferably 1 to 15 μm.

The laser light to be applied to the color forming layer is preferably pulse type laser with an output of 0.4 $J/cm^2$●pulse or above, or scanning type laser with an output of 0.4 $J/cm^2$ or above. The types of laser usable in this invention include far infrared laser such as carbon dioxide laser, near infrared laser such as YAG laser, and ultraviolet laser such as excimer laser, but infrared laser, especially far infrared laser such as TEA carbon dioxide laser is preferred.

EXAMPLES

The present invention is explained in more detail in the following Examples, but it should be recognized that the scope of the present invention is not restricted to these Examples.

Referential Example 1

A mixture consisting of 35.0 parts of 3-diethylamino-7-o-fluoroanilinofluoran (melting point: 216° C.), 50.0 parts of a 10% polyvinyl alcohol aqueous solution and 15.0 parts of water was subjected to dispersion treatment by a sand grinder for 2 hours to prepare a dispersion (A) of a color former having an average particle size of about 0.8 μm.

Referential Example 2

A mixture consisting of 35.0 parts of 3-diethylamino-7-o-chloroanilinofluoran (melting point: 220°–221° C.), 50.0 parts of a 10% polyvinyl alcohol aqueous solution and 15.0 parts of water was subjected to dispersion by a sand grinder for 2 hours to prepare a dispersion (B) of a color former having an average particle size of about 0.8 μm.

Referential Example 3

A mixture consisting of 35.0 parts of 2,2-bis (4-(6'-(N-cyclohexyl-N-methylamino)-3'-methylspiro(ph thalido-3,9'-xanthene)-2'-ylamino)phenyl)propane (melting point: 230°–238° C.), 50.0 parts of a 10% polyvinyl alcohol aqueous solution and 15.0 parts of water was subjected to dispersion by a sand grinder for 2 hours to prepare a dispersion (C) of a color former having an average particle size of about 0.8 μm.

Referential Example 4

A mixture consisting of 35.0 parts of 3-dibutylamino-6-methyl-7-phenylaminofluoran (melting point: 180°–184° C.), 50.0 parts of a 10% polyvinyl alcohol aqueous solution and 15.0 parts of water was subjected to dispersion by a sand grinder for 2 hours to prepare a dispersion (D) of a color former having an average particle size of about 0.8 μm.

Referential Example 5

A mixture consisting of 35.0 parts of 3-(N-cyclohexyl-N-methylamino)-6-methyl-7-phenylaminofluoran (melting point: 202°–205° C.), 50.0 parts of a 10% polyvinyl alcohol aqueous solution and 15.0 parts of water was subjected to dispersion by a sand grinder for 2 hours to prepare a dispersion (E) of a color former having an average particle size of about 0.8 μm.

Referential Example 6

A mixture consisting of 35.0 parts of 2,2,,6,6'-tetramethyl-4,4'-sulfonyldiphenol (melting point: 298°–300° C.), 50.0 parts of a 10% polyvinyl alcohol aqueous solution and 15.0 parts of water was subjected to dispersion by a sand grinder for 2 hours to prepare a dispersion (F) of a color developer having an average particle size of about 0.8 μm.

Referential Example 7

A mixture consisting of 35.0 parts of 2,2',6,6'-tetrabromo-4,4'-sulfonyldiphenol (melting point: 278°–280° C.), 50.0 parts of a 10% polyvinyl alcohol aqueous solution and 15.0 parts of water was subjected to dispersion by a sand grinder for 2 hours to prepare a dispersion (G) of a color developer having an average particle size of about 0.8 μm.

Referential Example 8

A mixture consisting of 35.0 parts of bis-phenol S (melting point: 248°–250° C.), 50.0 parts of a 10% polyvinyl alcohol aqueous solution and 15.0 parts of water was subjected to dispersion by a sand grinder for 2 hours to prepare a dispersion (H) of a color developer having an average particle size of about 0.8 μm.

Referential Example 9

A mixture consisting of 35.0 parts of bisphenol A (melting point: 160° C.), 50.0 parts of a 10% polyvinyl alcohol aqueous solution and 15.0 parts of water was subjected to dispersion by a sand grinder for 2 hours to prepare a dispersion (I) of a color developer having an average particle size of about 0.8 μm.

Referential Example 10

A mixture consisting of 60.0 parts of aluminum hydroxide and 40.0 parts of 12.5% polyvinyl alcohol was subjected to dispersion by a sand grinder for 2 hours to prepare a dispersion (J) of aluminum hydroxide having an average particle size of about 1 μm.

Referential Example 11

A mixture consisting of 40.0 parts of muscovite, 50.0 parts of 10% polyvinyl alcohol and 10.0 parts of water was subjected to dispersion by a sand grinder for 2 hours to prepare a dispersion (K) of muscovite having an average particle size of about 1 μm.

Test Specimen 1

Dispersion (A), dispersion (F), dispersion (J) and a 40% acrylic emulsion were mixed in a ratio of 24: 55:20:30 (by weight) to form a coating solution of a marking composition, and this coating solution was coated on an aluminum base by a No. 10 bar coater and dried at 50° C. to obtain a test specimen having an approximately 10 μm thick color forming layer.

Test Specimens 2–12

The respective dispersions were mixed in the ratios (by weight) shown in Table 1 below in accordance with method for preparation of the coating solution in the test specimen 1 to prepare the coating solutions of the marking compositions, and these coating solutions were coated on an aluminum base by a No. 10 bar coater and dried at 50° C. to make the test specimens 2–12 having an approximately 10 μm thick color forming layer.

Comparative Test Specimen 1

Dispersion (A), dispersion (I), dispersion (J) and a 40% acrylic emulsion were mixed at a ratio of 24: 55:20:30 (by weight) to prepare a coating solution of a marking composition, and this coating solution was coated on an aluminum base by a No. 10 bar coater and dried at 50° C. to make an approximately 10 μm thick comparative test specimen 1.

Example 1

Each of the Test Specimens 1–12 and Comparative Test Specimen 1 was subjected to the 120° C./2-hour, 180° C./30-minute and 210° C./2-minute heat treatments and then exposed to one shot of laser beams with various levels of energy by using a pulse type carbon dioxide laser (BLAZAR 6000 produced by Laser Technics Co., Ltd.), and the vividness of the formed marks and heat resistance of the specimens (degree of discoloration of the ground) were evaluated. The results are shown in Table 2. The color developing quality of each specimen before the heat resistance test, as determined by applying laser beams, is also shown in Table 2 for reference.

TABLE 1

| | | Test Specimen | | | | | | | | | | | | Comparative Test Specimen |
|---|---|---|---|---|---|---|---|---|---|---|---|---|---|---|
| | | 1 | 2 | 3 | 4 | 5 | 6 | 7 | 8 | 9 | 10 | 11 | 12 | 1 |
| Color former | Dispersion A | 24 | 24 | | | | | | | 24 | | | 12 | 24 |
| | Dispersion B | | | 24 | 24 | | | | | | 24 | | | |
| | Dispersion C | | | | | 24 | 24 | | | | | 24 | | |
| | Dispersion D | | | | | | | 24 | | | | | | |
| | Dispersion E | | | | | | | | 24 | | | | | |
| Color developer | Dispersion F | 55 | 55 | | | | | 55 | | 40 | | | 55 | |
| | Dispersion G | | | 55 | 55 | | | | 55 | | 40 | | | |
| | Dispersion H | | | | | 55 | 55 | | | | | 70 | | |
| | Dispersion I | | | | | | | | | | | | | 55 |
| | Dispersion J | 20 | | 20 | | | | 20 | | | 10 | | | 20 |
| | Dispersion K | | | | | | 20 | | 20 | | | | | |
| | 40% acrylic binder | 30 | 30 | 30 | 30 | 20 | 30 | 30 | 30 | 20 | 30 | 30 | 30 | 30 |

TABLE 2

| Test Specimen | 120° C./ 2 hr | 180° C./ 30 min | 210° C./ 2 min | Color developing quality |
|---|---|---|---|---|
| 1 | ○ | ○ | ○ | ◎ |
| 2 | ○ | ○ | ○ | ○ |
| 3 | ○ | ○ | ○ | ◎ |
| 4 | ○ | ○ | ○ | ○ |
| 5 | ○ | Δ | x | ◎ |
| 6 | ○ | Δ | x | ◎ |
| 7 | ○ | ○ | Δ | ○ |
| 8 | ○ | ○ | ○ | ◎ |
| 9 | ○ | ○ | ○ | ○ |
| 10 | ○ | ○ | ○ | ◎ |

TABLE 2-continued

| Test Specimen | 120° C./ 2 hr | 180° C./ 30 min | 210° C./ 2 min | Color developing quality |
|---|---|---|---|---|
| 11 | ○ | Δ | x | ⊙ |
| 12 | ○ | ○ | ○ | ○ |
| Comparative Test Specimen 1 | xx | xx | xx | ⊙ |

1) Heat resistance (degree of discoloration of the ground under various temperatures) and the degree of laser printing were visually judged according to the following criterion:

xx: Perfect discoloration of the ground occurred and printing by laser could not be recognized at all.

x: Substantial discoloration of the ground occurred and printing by laser was not clear although recognizable.

Δ: Discoloration of the ground occurred but laser printing was good.

○: No discoloration of the ground occurred and laser printing was excellent.

2) The color developing quality of each specimen was judged according to the following criterion:

x: No development of color.

○: Moderate degree of color development.

⊙: Vivid color development.

As is seen from Table 2, Comparative Test Specimen 1 prepared by using a color developer having a melting point of 160° C. caused perfect discoloration of the ground in the heat resistance test at 120° C. and could form no mark by application of laser beams after the heat test.

In contrast, in the case of the Test Specimens 1–12 of the present invention prepared by using a color developer having a melting point of 200° C. or higher, no discoloration of the ground was caused in the 120° C. heat resistance test, and the degree of printing by laser beam application was excellent.

It is significant that the Test Specimens 1–4, 7–10 and 12 prepared by using a color developer having a melting point of 260° C. or above showed good results in the 210° C. heat resistance test. It is also remarkable that the Test Specimens 1–4, 8–10 and 12 prepared by using both a color former having a melting point of 200° C. or above and a color developer having a melting point of 260° C. or above caused no discoloration of the ground and showed very excellent results even in the 210° C. heat resistance test.

Example 2

Test Specimen 1 is exposed to one shot of laser beams by using the same pulse type carbon dioxide laser as employed in Example 1 to form a mark and then subjected to a heat treatment at 120° C. for 2 hours. There can be obtained a mark with excellent print quality without causing discoloration of the ground.

What is claimed is:

1. A laser marking method which comprises the steps of:

providing on a surface of a base article a thin film of a laser marking composition that has been subjected to a heat treatment for 1 minute to 2.5 hours, said laser marking composition containing a color former, a developer having a melting point of 200° C. or above, and a laser light absorptive inorganic compound, and applying laser light to said thin film.

2. A laser marking method according to claim 1, wherein, the melting point of the color former is 150° C. or above, the melting point of the color developer is 230° C. or above, and the heat treatment temperature is 100°–250° C.

3. A laser marking method according to claim 2, the heat treatment temperature is 150°–250° C.

4. A laser marking method according to claim 1, wherein the melting point of the color former is 200° C. or above, the melting point of the color developer is 260° C. or above, and the heat treatment temperature is 150°–250° C.

5. A laser marking method according to claim 4, wherein the heat treatment temperature is 180°–230° C.

6. A laser marking method according to claim 1, wherein the color developer is 2,2',6,6'-tetramethyl-4,4'-sulfonyldiphenol, 2,2',6,6'-tetrabromo-4,4'-sulfonyldiphenol or 4-hydroxyisophthalic acid.

7. A laser marking method according to claim 1, wherein the base article is-one made of a metal, a synthetic resin or paper.

8. A laser marking method according to claim 1, wherein the laser light is infrared laser light.

9. A laser marking method which comprises the steps of:

providing a thin film on a surface of a base article, said thin film being made of an aqueous laser marking composition containing a color former having a melting point of 200° C. or above, a color developer having a melting point of 260° C. or above, a laser light absorptive inorganic compound, and water and having been subjected to a heat treatment at 150°–250° C. for 1 minute to 2.5 hours; and applying laser light to said thin film.

10. A laser marking method according to claim 9, wherein the color developer is 2,2',6,6'-tetramethyl-4,4'-sulfonyldiphenol, 2,2',6,6'-tetrabromo-4,4'-sulfonyldiphenol or 4-hydroxyisophthalic acid.

11. A laser marking method according to claim 9, wherein the base article is a metallic can.

12. A laser marking method according to claim 9, wherein the laser light is far infrared laser light.

13. An aqueous laser marking composition comprising a color former having a melting point of 200° C. or above, a color developer having a melting point of 260° C. or above, a laser light absorptive inorganic compound, and water.

14. An article comprising a structural body having a surface, a thin film that has been subjected to a heat treatment for 1 minute to 2.5 hours applied to said surface of said structural body, said thin film composed of a composition containing a color former, a color developer having a melting point of 200° C. or above, and a laser light absorptive inorganic compound.

15. An article according to claim 14, wherein the heat treatment temperature is 150°–250° C.

16. A laser marking method which comprises the steps of:

providing a thin film of a laser marking composition on the surface of a base article, said laser marking composition containing a color former, a color developer having a melting point of 200° C. or above, and a laser light absorptive inorganic compound, applying laser light to said thin film, and subjecting the third film to a heat treatment for 1 minute to 2.5 hours.

17. A laser marking method according to claim 16, wherein the heat treatment temperature is 60°–140° C.

18. A laser marking method according to claim 1, wherein the laser light absorptive inorganic compound is aluminum-hydroxide or mica.

19. A laser marking method according to claim 9, wherein the laser light absorptive inorganic compound is aluminum hydroxide or mica.

20. A laser marking method according to claim 16, wherein the laser light absorptive inorganic compound is aluminum hydroxide or mica.

* * * * *